United States Patent [19]

Tucker

[11] 3,840,711

[45] Oct. 8, 1974

[54] TELEPHONE WALL MOUNT

[75] Inventor: Council A. Tucker, Los Angeles, Calif.

[73] Assignee: American Telecommunications Corporation, El Monte, Calif.

[22] Filed: Apr. 9, 1973

[21] Appl. No.: 348,957

[52] U.S. Cl. .................................... 179/146 R
[51] Int. Cl. .................................... H04m 1/11
[58] Field of Search .................... 179/146 R, 182

[56] References Cited

UNITED STATES PATENTS 1,813,887 7/1931 Cadieux .................... 179/100 R

*Primary Examiner*—William C. Cooper
*Attorney, Agent, or Firm*—Christie, Parker & Hale

[57] ABSTRACT

A mount for a telephone is attached to a permanent telephone outlet by engaging a guide of the mount with a faceplate of the outlet and rotating the mount towards the outlet. As the mount approaches the faceplate, rails of the faceplate engage latches of the mount and open them. When the latches clear the rails they snap under them and the mount is secured to the faceplate. With the rotation the guide rotates into the mount. A trigger of the mount opens the latches to permit removal of the mount from the wall outlet when it is desired to remove the telephone. Features of the present invention include the facility either to mount a telephone over a recessed outlet or to mount it slightly away from the wall in a surface mounting.

13 Claims, 5 Drawing Figures

TELEPHONE WALL MOUNT

BACKGROUND OF THE INVENTION

The present invention relates in general to the art of telephones, and, more in particular, to an apparatus which is useful in mounting a telephone to a wall.

Wall mounted telephones are popular in a variety of locations, for example, in a kitchen or a workshop. Very simply, wall mounted telephones are mounted on a wall at a convenient height for the proprietor of the telephone.

It has been suggested that with the increased use of telephones, several permanently installed telephone outlets be located in, say, a dwelling to enable a telephone subscriber to merely purchase whatever equipment is desired and to install the equipment in the locations desired. Even where the telephone company installs the telephone equipment, several permanent outlets facilitate telephone installation, maintenance and flexibility of telephone location.

While the provision of several telephone outlets in and of itself affords considerably greater flexibility than having a new telephone outlet wired to each desired location every time a change of location is desired, the concept suffers unless some means can be provided to enable the installation of a telephone to a permanently installed outlet without rewiring or wiring the telephone to the outlet. Clearly, a plug and plug receptacle (jack) for the telephone instrument and wall connection, respectively, provide an ideal mechanism for telephone installation without wiring.

In wall mounted telephone units, however, it is mandatory that the telephones be mounted against the wall without the plug and jack showing and that some provision be made to carry the considerable weight of the telephone. It is therefore desirable to have the plug and jack masked by the telephone instrument proper. This presents the problem of making the connection between the telephone instrument and the telephone outlet during the mounting of the telephone instrument on the wall. Moreover, the considerable weight of the telephone instrument cannot be borne to any great measure by the plug and jack combination.

Accordingly, there is a need for a means to mount a telephone instrument against a vertical wall while at the same time coupling the telephone instrument through a plug with a telephone outlet jack and to support the telephone instrument essentially independently of the plug and jack.

SUMMARY OF THE INVENTION

The present invention provides a wall mount for a telephone instrument which is capable of completely masking a telephone outlet, which is easily installed on the outlet, and which may be readily removed for servicing the telephone or telephone relocation.

One form of the present invention contemplates a base upon which the telephone instrument may be mounted. The base contains latch means for securing the mount to a telephone wall outlet be merely pressing the mount against the outlet. The base also has means for removing the mount, and means to effect connection between a telephone instrument and the telephone service lines through a plug and jack.

In one form the present invention contemplates a base for the mounting of a telephone instrument. The base contains latches which are adapted to engage flanges of a faceplate of the wall outlet and secure the mount and the faceplate together against face-to-back displacement. Side-to-side and vertical displacement is prevented by separate means on the mount which engage horizontal and vertical ends of the faceplate. To effect accurate register of a male connecting plug with a female plug receptacle or jack, a guide pilots the mount and its carried plug accurately into position with respect to the faceplate and jack. Briefly, this guide comprises a member rotationally mounted to the base which has registration means to engage the faceplate and determine both vertical and horizontal mount positions. The mount is then swung about the rotational axis of the guide into place flush against the faceplate.

Preferably, the registration means of the guide includes a pair of ears and a horizontal bearing edge associated with each ear. Each ear is adapted to pass under a vertical mounting rail on each side of the faceplate. The bearing edges engage an upper surface of the faceplate.

The preferred latching means of the present invention consists of a pair of spaced apart latches mounted longitudinally on the base and capable of pivoting about longitudinal and parallel axes between a closed and an open position. The latches are normally in a closed position and are maintained that way through biasing means such as a tension spring. A pair of spaced apart and horizontal straps provide pivot journals for the latches and bearing support for them in their closed position. Each latch has a longitudinally extending bearing surface in engagement with the roof of the base to provide pivotal bearing between each latch and the base. Each latch has a longitudinal locking flange facing the cooperating locking flange of the other latch. These locking flanges are adapted to pass over and engage the locking flanges of the faceplate. Stated in different words, the locking flanges of the faceplate and the locking flanges of the latches cooperate in a locked position by having the locking flanges of the faceplate overlying the locking flanges of the latches. Preferably the leading edges of the locking flanges of the latches are feathered to facilitate pivoting of the latches during opening. It is also preferred to angle the locking flanges at their upper ends so that when the mount is installed on the faceplate a peeling action on the locking flanges by the locking flanges of the faceplate occurs.

A preferred means to effect removal of the wall mount of the present invention comprises a trigger pivotally mounted within the base and having a pair of longitudinally extending arms which pass under engagement pads of the latches. With pivotal movement of the trigger in a predetermined direction the latches are opened to clear the flanges of the faceplate.

It will be recalled that in installing the mount on the faceplate of the outlet the mount is swung into its installed position. In order to effect proper register of the plug carried by the mount with the jack in the outlet, the plug is mounted so that it can float slightly and accommodate the angular mismatch brought about with the swinging of the mount flush against the faceplate. This may be done by a flexible mounting of the plug with the strap.

It is obvious that both the vertical and horizontal positions of the mount with respect to the faceplate with which it is used are extremely important for the plug's reception by the jack. Vertical loads and positioning are determined by bosses bearing on horizontal edges of the faceplate. Horizontal loads and positioning are determined by upright interior walls of the straps bearing on vertical edges of the faceplate. Also the mounting of the latches with respect to the mounting of the plug is very important. To effect proper lateral or horizontal alignment, the straps which determine the closed position of the latches and which also provide the journals for the mounting of the latches to the base are very accurately placed in the base and provide a very rigid stop for the latches. Specifically, the latches are recessed in spaced-apart longitudinal locations and the ends of the straps are received in the recesses. A web of the latches engages an upright stop of the straps. Each strap in turn is secured to the base through fasteners secured in mounting bosses of the base. Each strap has a pair of recesses which are adapted to fit over the mounting bosses. The recesses are larger than the bosses to facilitate installation of the straps. However, the relationship between the bosses and the straps is such that engagement along one lateral wall of each of the bosses and each of the recesses occurs to ensure proper lateral positioning of the straps with respect to the base, and, as a consequence, the latches with respect to the base and locking flanges of the faceplate.

These and other features, aspects and advantages of the present invention will become more apparent from the following description, appended claims and drawings.

DESCRIPTION OF THE PREFERRED EMBODIMENTS

The wall mount of the present invention is used to mount a telephone to a vertical surface such as a wall. The wall mount accomplishes mounting without transferring any substantial load to the electrical connections between the telephone instrument and a telephone outlet, while at the same time masking the electrical connections. The wall mount of the present invention also makes it very convenient to install a wall mounted telephone and to remove it.

Figures 1, 4:
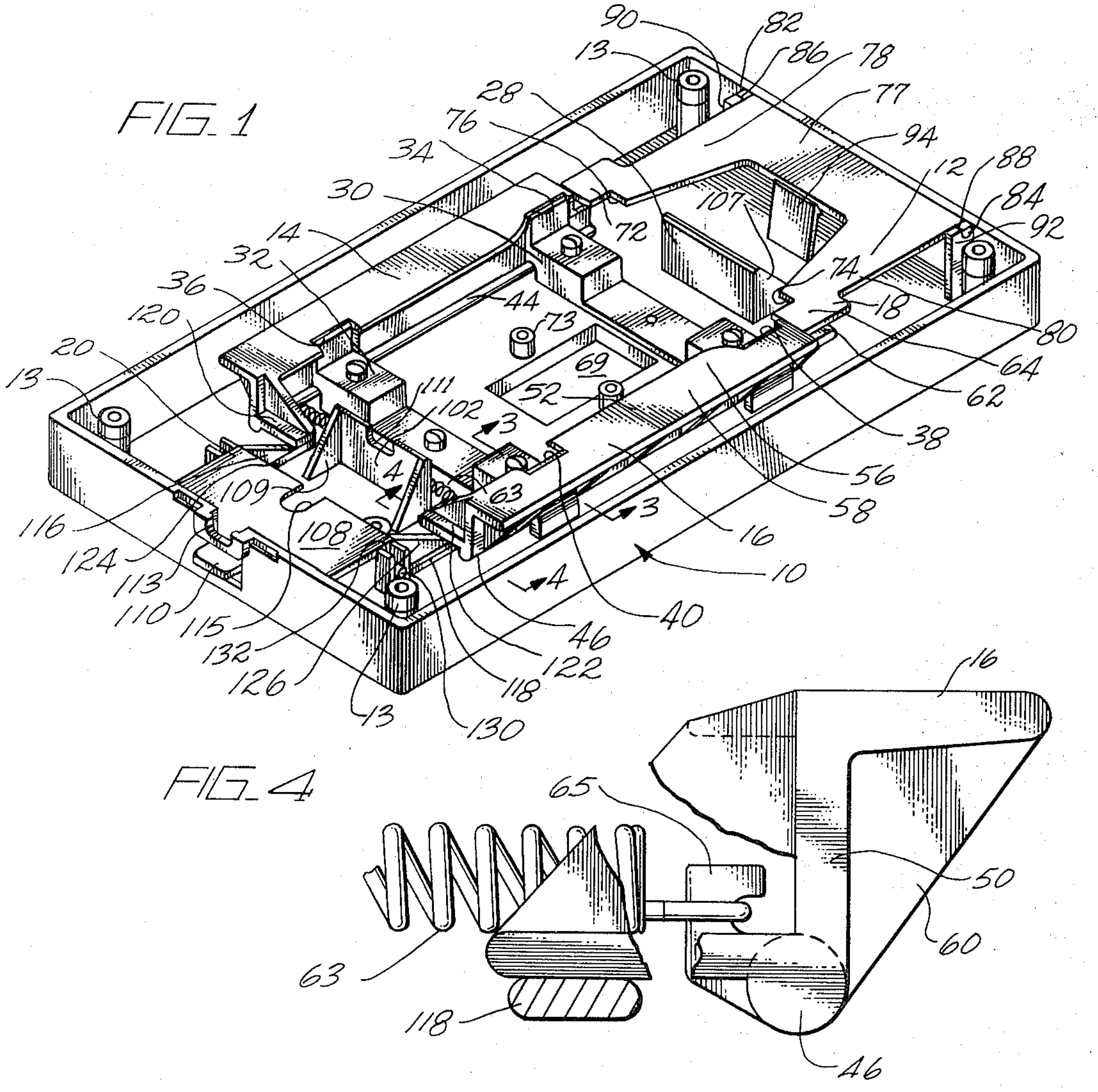
FIG. 1 is a perspective view looking at the bottom of the telephone wall mount of the present invention.
FIG. 4 is a fragmentary view taken generally along line 4—4 of FIG. 1 illustrating the coupling of the latches of the wall mount of FIG. 1 through a spring and also the engagement of the actuating arm of the trigger of the wall mount with the latches.

With initial reference to FIG. 1, the bottom of the wall mount of the present invention is shown in perspective view. In general, the wall mount consists of a base 10 which has a hollow interior. A plurality of feet 13 are provided at the corners of the base for engaging the surface onto which the wall mount is attached. These feet may be capped with rubber pads. A pair of vertical and longitudinal latches 14 and 16 are in parallel relationship with each other within the interior of the base. These latches are capable of rotating from the position illustrated in FIG. 1 to a more open position to receive rails or locking flanges of a faceplate, to be described shortly. A guide 18 is pivotally secured to the base for movement between an open position, shown in phantom in FIG. 2, and a closed position shown in that Figure and in FIG. 1. The function of the guide is to engage the faceplate and horizontally and vertically orient the wall mount with respect thereto. A trigger 20 is hand operable to open the latches, as for the removal of the mount from the faceplate.

Figure 2:
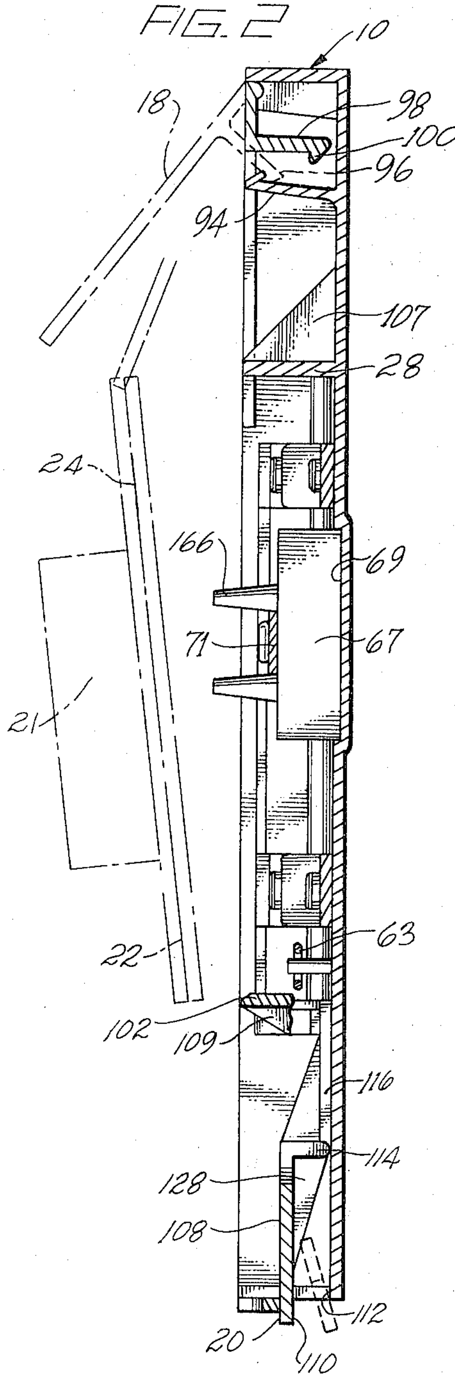
FIG. 2 is a side elevational view, generally in half section, of the telephone wall mount illustrated in FIG. 1, with the material shown in phantom illustrating the use of the wall mount.
Figure 5:
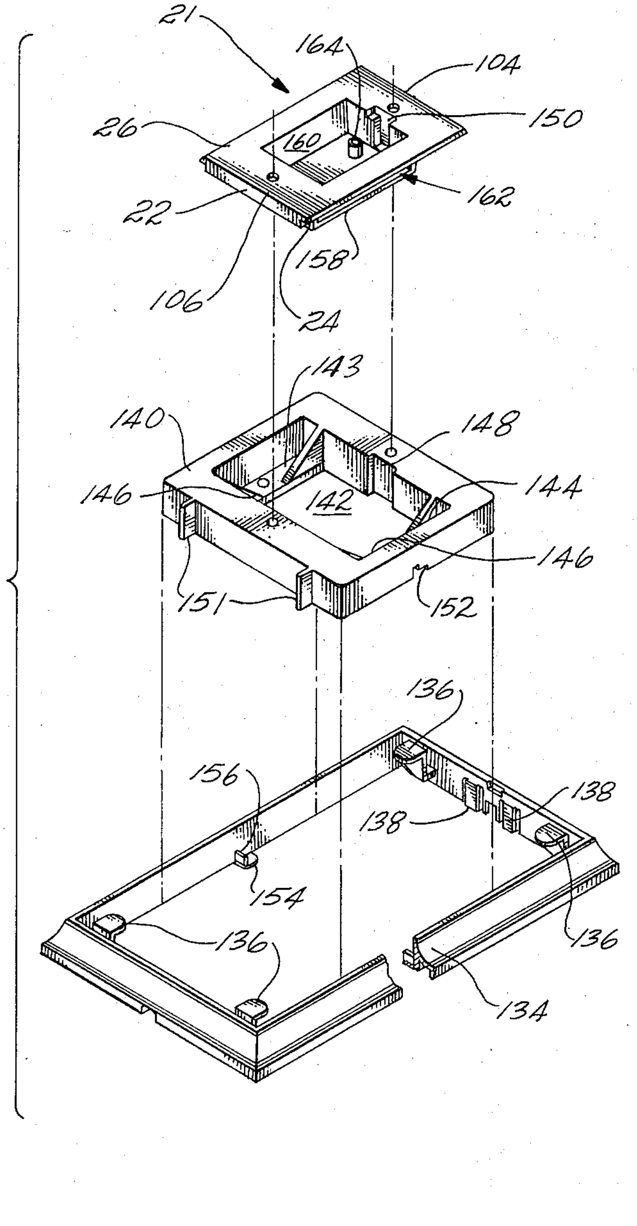
FIG. 5 is a perspective, exploded view illustrating the equipment which can be used with the wall mount of the present invention and, in particular here, the apparatus which is used for a surface wall mount wherein the telephone outlet is not recessed in a wall.

With brief reference to FIGS. 2 and 5, an outlet box 21 having a faceplate 22 for use with the wall mount of the present invention is illustrated. The faceplate typically is mounted in a wall and is recessed with only a pair of longitudinally extending rails or locking flanges 24 and 26 protruding slightly from the surface of the wall. Rails 24 and 26 extend longitudinally the entire length of the faceplate. In short, the faceplate in typical installations resembles a junction box save for the protrusion of the rails a slight distance from the wall.

Returning then to the description of the wall mount of the present invention, a brief description of its operation at this time will facilitate the understanding of the invention.

When it is desired to mount a telephone to a wall having a telephone outlet housed in a junction box recessed in the wall with faceplate 22 raised slightly from the wall, it is only necessary to rotate guide 18 to the intermediate position shown in phantom in FIG. 2 and to engage the upper end of the faceplate just under its flanges. The wall mount is then rotated into position flush against the faceplate with the guide always in engagement with the faceplate. During this rotational movement, male plug stabs will be received in cooperating female plug receptacles in the outlet. When rails 24 and 26 of the faceplate engage latches 14 and 16, a force is applied to the latches which tend to rotate them open. Upon rotation of the latches to an open position, the rails clear facing flanges of the latches and allow the latches to close over the rails and secure the wall mount to the telephone outlet. A bearing boss 28 on the base butts against the upper horizontal edge of the faceplate to carry the weight of the mount and telephone. When it is desired to remove the mount, trigger 20 is depressed to open the latches and clear their facing flanges from the flanges of the faceplate.

Proceeding then with a detailed description of a wall mount of the present invention, latches 14 and 16 are disposed within a recess of the wall mount and are held in position through a pair of laterally oriented straps 30 and 32. These straps provide a bearing for the latches in their closed position.

Figure 3:
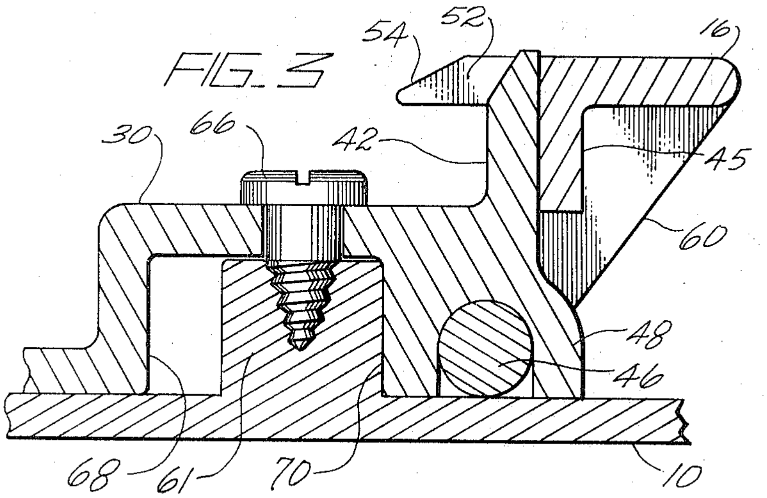
FIG. 3 is a fragmentary view taken in general along line 3—3 of FIG. 1 to illustrate the mounting of the latches of the wall mount of the present invention.

It will be noted that each of the latches is recessed, at 34 and 36 for latch 14 and at 38 and 40 for latch 16. These recesses receive lateral ends of the straps. Perpendicular end walls of the straps bear against cooperating perpendicular walls in the recesses of the latches to provide the requisite bearing required to hold the latches in their closed position. This is seen in FIG. 3 by an upright wall 42 of strap 30 and a cooperating wall 45 of latch 16. Each of the latches rotationally bears on the roof of base 10 through longitudinally extending cylindrical bearings 44 and 46. As is illustrated in FIG. 3, bearing 46 of latch 16 is secured to the base through a U-shaped journal 48 of strap 30. Each latch is journaled in both of the straps through U-shaped journals identical to that shown in FIG. 3.

Because latch 14 and latch 16 are mirror images of each other, only latch 16 will be described in detail with reference to FIGS. 1, 3 and 4. As previously mentioned, latch 16 has a longitudinal, generally cylindrical surfaced bearing 46 which bears against the roof of base 10. The latch extends generally perpendicularly from this bearing through a web 50. Web 50 is capped by an inwardly directed locking flange 52. This flange is feathered on its leading edge at 54 to facilitate rotation of the latch outwardly by bearing against a cooperating locking rail or flange of the faceplate. At the upper end of the latch the leading edge of the flange may be angled slightly outward at 56 to facilitate opening of the latch by a peeling action. A horizontal stiffening section 58 extends laterally outward from locking flange 52 and web 50. At regular intervals along the length of latch 16, generally triangular reinforcing ribs 60 extend from section 58 and web 50 downwardly to meet bearing 46. Thus each of the latches has considerable resistance against bending forces occurring during engagement of the flanges of the faceplate. At the upper end of latch 16 a recessed pad 62 is provided for an ear 64 of guide 12 to rest on when the guide is closed.

With reference to FIG. 4, the means for coupling the latches together into a normally closed position is illustrated. A spring 63 is connected to a hook 65 of latch 16 which extends inwardly of bearing 46. Latch 14 has an identical arrangement and is coupled to latch 16 by spring 63.

In FIG. 3, the wall mount has a fastener boss 61 for a fastener 66 to hold strap 30 in place. The strap has a recess 68 for receiving the boss, the recess being slightly larger than the boss for ease of installation. Registration of the fastener holes in the strap and the boss is effected through engagement of the outside walls of the boss with an interior wall 70 of the strap. A similar mounting boss arrangement is provided for each end of each of the straps.

With reference to FIG. 2, a plug 67 nests in a recess 69 in the ceiling of the base. The plug is retained there by a flexible strap 71 which straddles the plug between stabs thereof and is attached to the base by fasteners in mounting bosses 73.

With reference to FIG. 1, guide 12 includes a pair of longitudinally extending ears 64 and 72, which, together with adjoining lateral bearing edges or steps 74 and 76, bear on the upper corners of faceplate 22 during installation of the wall mount and after the wall mount has been installed. Ears 72 and 64 are connected to a base portion 77 of the guide through a pair of longitudinally extending arms 78 and 80, respectively. The base portion of the guide is transverse to the arms and provides the mounting and coordination for the arms and ears. A pair of laterally extending pivot pins 82 and 84 extend laterally from the base of the guide and are received, respectively, in slots 86 and 88 of a pair of guide mounts 90 and 92 of base 10. As is seen in FIGS. 1 and 2, base 10 has a catch 94 that has a hook 96 at its upper end. The guide has a cooperating catch 98 which has a hook 100 at its end. The catches of the base and guide cooperate, as shown in phantom in FIG. 2, to prevent the guide from rotating too far out of position during the installation of the mount on faceplate 22 by the hooks engaging each other.

While the engagement of latches 14 and 16 with flanges 24 and 26 of faceplate 22 provides the locking of the wall mount flush against a telephone outlet, means are also provided to prevent vertical and horizontal movement of the wall mount with respect to the outlet. The vertical of these means include a pair of horizontal position bosses 28 and 102 of the base for bearing on upper and lower horizontal edges 104 and 106, respectively, of the faceplate, the edges being shown in FIG. 5. These position bosses are gusseted at 107 and 109 to provide rigidity. Boss 102 has a conductor passage 111. The means for preventing horizontal movement consist of the interior, vertical end walls of straps 30 and 32. As is seen in FIG. 3, the interior of wall 42 is feathered to pilot the wall over vertical edges of the faceplate. The vertical surface of wall 42 actually bears on a faceplate edge to maintain the horizontal positional relationship between the mount and the faceplate. The same relationship applies for each of both straps.

As previously mentioned, means is provided to remove the wall mount and telephone instrument from the faceplate for whatever purpose desired. These means in general comprise trigger 20 pivotally mounted in base 10 to spread latches 14 and 16 apart upon depression. More specifically, and as illustrated in FIGS. 1 and 2, the trigger includes a generally horizontally extending portion 108. A tab 110 extends externally of the wall mount from horizontal portion 108 through a hole 112 in base 10 below line cord passage 113. The horizontal portion meets a perpendicular web 114 which is radiused at its bottom to provide a pivot for the trigger. Web 114 and horizontal portion 108 have a U-shaped mounting boss passage 115. Laterally spaced-apart and longitudinally extending arms 116 and 118 extend under each of the latches, as is shown in FIGS. 1, 2 and 4. Latches 14 and 16 have pads 120 and 122, respectively, for the engagement by the ends of arms 116 and 118, respectively, of the trigger. Reinforcing gussets 124 and 126 extend from the arms to web 114. A similar reinforcement gusset 128 extends from the web to the horizontal portion to provide rigidity in the trigger. The web has a pair of laterally extending pins for pivotally mounting the trigger to the base. One of these pins is shown in FIG. 1 at 130. The pins reside in a pair of upright slotted trigger mounts of the base, one of which is indicated by reference numeral 132 in FIG. 1. Actuation of the trigger by depressing tab 110 rotates the trigger slightly to bring arms 116 and 118 into engagement with pads 120 and 122 to force latches 14 and 16 to rotate open against the force of spring 63.

The wall mount of the present invention can be mounted flush against the wall or, if necessary, mounted spaced away from the wall. The flush mounting is possible when the telephone outlet is recessed into the wall with only the faceplate extending slightly from the surface of the wall to space its locking flanges from the wall. Sometimes this installation is either not possible or not desired. In this case the outlet is totally external of the wall and a surface mount is necessary.

In this event, the arrangement shown in FIG. 5 is used.

In FIG. 5 a frame 134 is illustrated. The frame can be used in flush mountings and is used in surface mountings. The frame is sized to receive the base of the wall mount for the flush mode of mounting. Four feet 136 are provided for bearing with pads on feet 13 of the base. In the event that a flush mounting is desired, feet 136 are merely broken off. Again, for the flush mounting mode, tabs 138 are provided at one end of the frame with similar tabs provided at the other end to resiliently engage and secure the frame to the base of the wall mount.

For the surface mount, an adapter bracket 140 is provided. This adapter bracket has a centrally open interior 142 for receiving outlet box 21. Bordering this open interior are a pair of mounting webs 143 and 144 recessed from the surface of the bracket and occupying the bottom. Reinforcing ribs or gussets 146 are provided for these webs. A position determining inset 148 on the lower portion of the bracket is provided to receive a protruding well 150 of the outlet box. The outlet is mounted to the bracket with the longitudinal axis of the outlet paralleling the longitudinal axis of the frame by appropriate fasteners. Spaced-apart guide stops 151 provide pilots for proper register of the guide with the faceplate by forcing ears of the guide beneath the longitudinal flanges of the faceplate. A position key slot is provided in each lateral wall of the bracket, one of which is shown at 152 in the Figure. The position key slot is generally L-shaped to receive a horizontally extending key 154 and a vertically extending key 156 of the frame. Obviously, the slot and keys have to be in register before the bracket can be received in the frame.

Outlet 21 generally consists of a saddle 158 to receive a female plug receptacle or jack. The sides of the outlet are open at 160 and 162 for wiring purposes. Fastener bosses 164 are used to secure the jack in the outlet. Well 150 is also for a conductor.

In operation and with primary reference to FIG. 2, the ears of guide 18 are placed beneath locking flanges 24 and 26 of faceplate 22. The mount is then pressed inwardly towards outlet 21 with the bottom of the mount resting against the surface of the wall in which the outlet is installed. The mount is then swung about the pivot of the guide for receipt of male stabs 166 of a plug 168 in cooperating receptacles in a jack (not shown). It is clear from FIG. 2 that during rotation of the wall mount there is a change in the angular relationship between the mount and the plug receptacles. To accommodate this the plug is only loosely retained with the mount so that it can rotate with respect to the mount and accommodate the angular misalignment. Flange 52 of latch 16 and the corresponding flange of latch 14 upon bearing against the locking flanges of the faceplate will spread apart against the force of spring 63 and clear the faceplate flanges. The flanges will then snap in under the flanges of the faceplate and the mount is secured in position. When the mount is flush against the wall, the vertical load of the mount and attached telephone are transferred to the faceplate of the outlet through boss 28 and any load acting upwardly of the mount is transferred from the mount to the faceplate through boss 102. When it is necessary or desirable to remove the mount, tab 110 is depressed to the position shown in phantom in FIG. 2 so that arms 116 and 118 of the trigger bear on pads 120 and 122 of the latches to spread the latches apart so that the flanges thereof clear the flanges of the faceplate.

The present invention has been described with reference to certain preferred embodiments. The spirit and scope of the appended claims should not, however, necessarily be limited to the foregoing description.

What is claimed is:

1. A mount for mounting a telephone instrument to an outlet on a wall or the like, the outlet having locking flanges, the mount comprising:

a. a base;

b. a pair of spaced-apart longitudinally oriented and parallel latches pivotally mounted in the base for securing the mount to the outlet on the wall, the latches having an open position for passing the locking flanges of the outlet and a closed position underlying such locking flanges;

c. guide means in the base for engaging the outlet and determining the vertical and horizontal positions of the wall mount with respect to the outlet;

d. means for opening the latches during installation of the mount on the outlet; and e. means to open the latches for removal of the wall mount from the outlet.

2. The mount claimed in claim 1 wherein:

the means for opening the latches during installation includes means on each latch engageable with the outlet to force the latch open.

3. The mount claimed in claim 1 wherein each latch:

a. is pivotally secured to the base for rotation about a longitudinal axis parallel with the rotational axis of the other; and b. has a longitudinal locking flange facing the locking flange of the other latch for engagement with a cooperating one of the locking flanges of the outlet.

4. The mount claimed in claim 3 wherein the outlet has a horizontal surface and means is provided in the base to transfer the weight of the mount and carried telephone to the outlet at the horizontal surface of the latter.

5. The mount claimed in claim 3 wherein the outlet has lateral and horizontal surfaces and the guide means is rotationally mounted in the base and engageable with the lateral and horizontal surfaces of the outlet to pilot the mount into proper position with respect to the outlet upon rotation of the mount about the guide's rotational axis.

6. The mount claimed in claim 5 wherein the locking flange of each of the latches has its leading edge angled from the longitudinal axis of the mount at the end closest to the guide such that upon the application of a rotational force on the mount in the direction of installation the latches peel apart by the action of the locking flanges of the outlet on the angled edges of the locking flanges of the latches.

7. The mount claimed in claim 3 wherein the opening means includes a trigger pivotally mounted in the base for rotation about an axis perpendicular to the rotational axes of the latches, means on the trigger externally of the base for rotating the trigger about its rotational axis, and means on the trigger engageable with the latches to force them open upon rotation of the trigger in a predetermined direction.

8. A wall mount for a telephone instrument for use in mounting the instrument to a telephone outlet, the outlet having a pair of flanges, the mount comprising:

a. a base;
b. a pair of parallel latches pivotally mounted in the base for rotation between an open and a closed position about laterally spaced-apart, parallel and longitudinal axes, each latch having a longitudinal locking flange for engaging in interference relationship a cooperating one of the flanges of the telephone outlet and being operable upon engaging such outlet flange to rotate to its open position;
c. means for mounting a plug in the base for coupling the telephone to the telephone outlet, the mounting means allowing slight rotational movement of the plug with respect to the base during installation;
d. a guide pivotally secured in the base for engaging the outlet and determining the horizontal and vertical positions of the mount with respect to the outlet upon rotation of the mount about the pivot of the guide flush against the outlet;
e. means in the base for transferring the weight of the mount and carried telephone to the outlet; and
f. means for opening the latches to remove the mount.

9. The wall mount claimed in claim 8 wherein:
a. means is provided to bias the latches into their closd position;
b. a pair of laterally extending and spaced-apart straps is provided, the latches bearing against the lateral ends of the straps in the closed position to define that position, each strap having a pair of laterally spaced-apart recesses; and
c. the base has mounting bosses received in the recesses of the straps with an outer lateral wall of each recess being in engagement with a cooperating one of the bosses.

10. The wall mount claimed in claim 8 wherein the opening means includes a trigger comprising:
a. a lateral pivot in bearing on the base;
b. a web having the pivot and extending from the pivot generally at right angles to the plane of the base;
c. a horizontal portion extending from the web longitudinally of the base and generally parallel to the base;
d. an actuating tab extending externally of the base from the horizontal portion;
e. a pair of spaced-apart arms extending from the web under the latches longitudinally of the base and generally parallel to the base; and
f. means for pivotally mounting the trigger to the base for rotation about the axis of the pivot upon actuation of the tab.

11. The wall mount claimed in claim 8 wherein the outlet has an upper horizontal surface and the guide means comprises:
a. a base portion pivotally mounted to the base for rotation about a transverse axis thereof;
b. first and second spaced-apart arms extending longitudinally from the base portion; and
c. first and second spaced-apart ears extending, respectively, from the first and second arms and defining therewith transverse interior engaging edges, the ears being positionable under the flanges of the outlet with the transverse interior engaging edges bearing on the horizontal surface of the outlet.

12. A wall mount for mounting a telephone instrument onto a vertically oriented telephone outlet housing a female plug receptacle, the outlet having a faceplate with a pair of spaced-apart and vertical locking flanges and upper and lower surfaces, the mount comprising:
a. a base;
b. a pair of spaced-apart latches pivotally secured to the base, each for rotation about an axis extending longitudinally of the base between a closed and an open position, each latch having an inwardly directed locking flange for engaging one of the locking flanges of the outlet with the latter overlying the former, each latch flange having means for opening its latch upon being forced against the cooperating flange of the outlet;
c. a pair of laterally extending and spaced-apart straps mounted to the base, the ends of each of the straps defining stops against which the latches rest in the latches' closed position and means for preventing horizontal movement of the mount with respect to the faceplate by abutting against vertical edges thereof;
d. a guide pivotally secured to the base at one end thereof in longitudinally spaced relationship to the latches, the guide having a pair of spaced-apart ears for passing under the locking flanges of the outlet and a step at right angles to the ears and extending inwardly therefrom for engaging the upper surface of the outlet proximate the terminus of the locking flanges thereof;
e. a pair of members in the base for engaging the upper and lower surfaces of the outlet to prevent vertical movement between the mount and the outlet;
f. means in the base for mounting a plug to couple a telephone instrument mounted on the mount to the plug receptacle in the outlet, such mounting means permitting the plug limited rotational movement with respect to the base for accommodating angular misalignment between the plug receptacle and the plug during installation and removal of the mount; and
g. means for removing the mount by opening the latches.

13. The wall mount claimed in claim 12 wherein a tapered surface at the guide end of each of the locking flanges of the latches is provided to facilitate installation of the mount from the outlet by a peeling action of the locking flanges of the outlet against the locking flanges of the latches.

* * * * *

)-1050
5/69)

UNITED STATES PATENT OFFICE
CERTIFICATE OF CORRECTION atent No. 3,840,711 Dated October 8, 1974 nventor(s) Council A. Tucker

It is certified that error appears in the above-identified patent and that said Letters Patent are hereby corrected as shown below:

In the specification: Column 1, line 62, "be" should be --by--.

In the claims: Claim 9, column 9, line 30, "closd" should be --closed--.

Signed and sealed this 17th day of December 1974.

(SEAL)
Attest:

McCOY M. GIBSON JR.
Attesting Officer

C. MARSHALL DANN
Commissioner of Patents